United States Patent
Veit et al.

(10) Patent No.: US 9,427,686 B2
(45) Date of Patent: Aug. 30, 2016

(54) FILTER DEVICE, IN PARTICULAR FUEL FILTER OR OIL FILTER

(71) Applicant: MANN+HUMMEL GMBH, Ludwigsburg (DE)

(72) Inventors: Martin Veit, Gaertringen (DE); Thomas Haubold, Marbach (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 289 days.

(21) Appl. No.: 14/046,996

(22) Filed: Oct. 6, 2013

(65) Prior Publication Data

US 2014/0102969 A1     Apr. 17, 2014

(30) Foreign Application Priority Data

Oct. 10, 2012   (DE) .......................... 10 2012 019 862

(51) Int. Cl.
*B01D 36/00*     (2006.01)
*B01D 36/02*     (2006.01)

(52) U.S. Cl.
CPC ............. *B01D 36/02* (2013.01); *B01D 36/003* (2013.01)

(58) Field of Classification Search
None
See application file for complete search history.

(56) References Cited

U.S. PATENT DOCUMENTS

| | | | |
|---|---|---|---|
| 3,228,527 A | | 1/1966 | McPherson |
| 3,312,351 A | * | 4/1967 | Kasten ................. B01D 17/045 210/307 |
| 4,292,179 A | * | 9/1981 | Stone ................... B01D 17/045 210/443 |
| 2013/0146524 A1 | * | 6/2013 | Veit ...................... F02M 37/221 210/300 |
| 2013/0327699 A1 | * | 12/2013 | Gaenswein ............ B01D 29/58 210/335 |

* cited by examiner

*Primary Examiner* — Benjamin Kurtz
(74) *Attorney, Agent, or Firm* — James Hasselbeck

(57) ABSTRACT

A filter device has an annular particle filter having a raw side face and a radially separated clean side face, and axially opposing end faces. An annular water separating element is arranged in a flow path downstream of the particle filter, the water separating element circumferentially surrounding the particle filter at a radial spacing. An open inner annular space is defined by and between the particle filter and the water separating element and an outer annular space is defined by and between the water separating element and the filter housing.

7 Claims, 2 Drawing Sheets

FILTER DEVICE, IN PARTICULAR FUEL FILTER OR OIL FILTER

CROSS REFERENCE TO RELATED APPLICATIONS

This application claims the benefit under 35 USC 119 of German application No. 10 2012 019 862.0 filed in Germany on Oct. 10, 2012, and which is hereby incorporated by reference in its entirety.

TECHNICAL FIELD

The present invention concerns a filter device such as for example a fuel filter for oil filter.

BACKGROUND OF THE INVENTION

A fuel filter or lubricant filter is disclosed in DE 10 2009 058 812 A1. The filter has an annular filter element that is flowed through in radial direction from the exterior to the interior by the fluid to be purified which subsequently is discharged axially out of the inwardly positioned clean space of the filter element. The filter element has correlated therewith a water separating device in the form of a coalescing element in which water, which is entrained in the fluid, is separated and subsequently is collected in a water collecting chamber. In coalescing elements, an agglomeration of dispersed small water droplets to larger droplets takes place; the latter, under their own weight, can flow out downwardly.

A multi-stage filter device for filtration of liquid fluids is disclosed in EP 1 932 570 4B1. The filter device has two annular, axially adjoining filter elements of which the first filter element is flowed through in radial direction from the exterior to the interior and the second filter element in radial direction from the interior to the exterior. On the side of the first filter element positioned inwardly in radial direction there is a water separating element that forms a lock for water droplets so that the water droplets will flow out along the water separating element.

SUMMARY OF THE INVENTION

The invention has the object to provide with simple constructive measures a filter device that is provided with an effective water separating action.

The invention relates to a filter device which is used preferably for liquid filtration such as for example for filtration of fuel or lubricants like hydraulic oil. Basically, a filtration of gaseous fluids which contain a liquid proportion is possible also.

The filter device is provided with an annular particle filter as well as with an annular water separating element that is arranged downstream of the particle filter. The fluid flows first through the particle filter, in which particle-shaped contaminants are removed from the fluid, and subsequently flows through the water separating element for separating the water proportion from the fluid. The water separating element surrounds the particle filter at a radial spacing so that an inner annular space is formed between the particle filter and the water separating element. Moreover, it is provided that a second outer annular space is located between the water separating element and a filter housing into which the particle filter as well as the water separating element are inserted.

This configuration enables the water droplets to be separated on a lateral surface of the water separating element while the fluid is able to penetrate the water separating element and is conveyed farther on the other side of the water separating element. Basically, a flow of the fluid through the water separating element in radial direction from the interior to the exterior as well as in radial direction from the exterior to the interior is possible. The annular spaces at both sides of the water separating element serve thus for supplying fluid including the water proportion or for further conveying the fluid that has been separated from the water proportion.

It is further advantageous that particle filter and the water separating element are each arranged in an annular shape and concentrically positioned relative to each other so that the required mounting space is minimized in axial direction. Since the water separating element surrounds the particle filter, the water separating element has a correspondingly larger radius. Accordingly, a relatively large surface is available on the hydrophobic water separating element for water separation.

It is in principle sufficient that the flow guiding action of the fluid is realized exclusively in radial direction. However, it is also possible that an end face, in particular a top end face of the particle filter, is flowed across by the fluid after the fluid has passed the particle filter in radial direction. After having flowed across the top end face edge, the pre-purified fluid flows from above to the lateral surface of the water separating element wherein the water droplets are separated at the inflow side of the water separating element and the fluid passes through the water separating element in radial direction. The separated water droplets, following the force of gravity, can flow downwardly along the wall of the water separating element and are expediently collected there in a water container. In case that the fluid, after having passed through the particle filter, is supplied immediately in radial direction to the water separating element without deflection across the end face, the separated water droplets, following expediently the force of gravity, are also guided downwardly on the wall of the water separating element into the water collecting container.

According to an advantageous embodiment, in addition to the particle filter and the water separating element, the filter device is provided with a coalescing element which is located in the flow path between the particle filter and the water separating element. On or in the coalescing element, an agglomeration of small water droplets that are dispersed in the fluid and agglomerate to larger water droplets is realized. On the water separating element, the larger water droplets can be separated subsequently and, as described above, following the force of gravity, can flow out along the wall of the water separating element.

The coalescing element is expediently a component that is designed separate from the particle filter and that preferably is resting on the clean side of the particle filter wherein an arrangement is possible in which the coalescing element is resting immediately on the clean side as well as an arrangement at a spacing to the clean side. Moreover, it is possible that the coalescing element is located in the area of the end face of the particle filter; after radial passage through the particle filter, the flow is guided across the end face of the particle filter through the coalescing element positioned thereat and subsequently to the inflow side of the water separating element.

According to a further expedient embodiment, it is provided that the coalescing element is integrated into the particle filter, for example, in that coalescing element fibers are interwoven with the material of the particle filter or are integrated in any other way into the particle filter element.

BRIEF DESCRIPTION OF THE DRAWINGS

Further advantages and expedient embodiments can be taken from the additional claims, the figure description and the drawings. It is shown in:

In the figures same components are identified with same reference characters.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Figure 1:
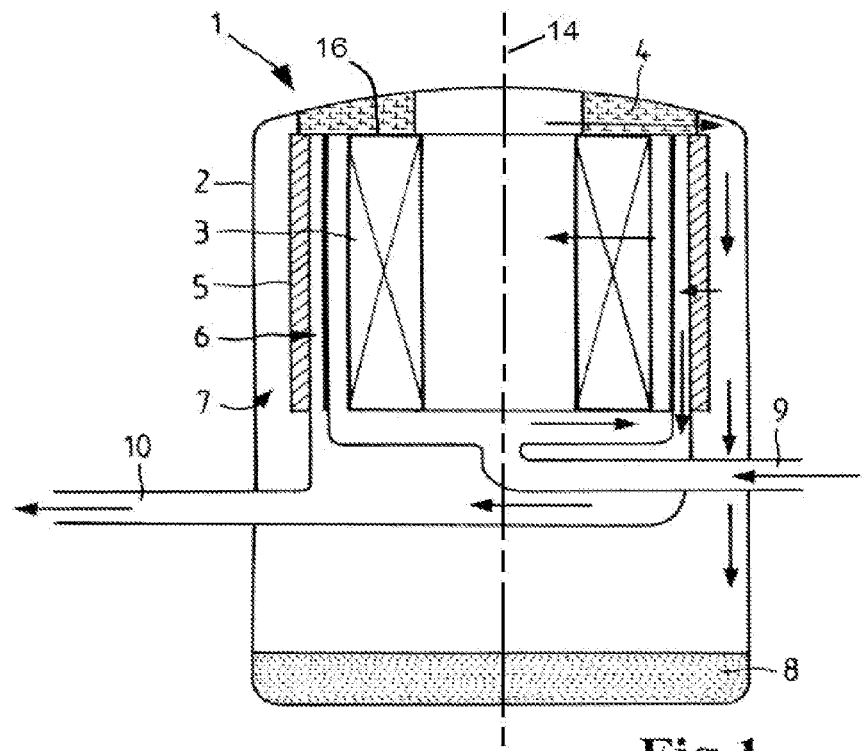
FIG. 1 a section illustration of a filter device for fuel filtration, comprising an annular particle filter and a surrounding water separating element that is also annular, comprising in the area of the top end face of the particle filter a coalescing element wherein the particle filter is flowed through in radial direction from the exterior to the interior.

In FIG. 1, a filter device 1 for fuel filtration is illustrated. In a filter housing 2, the filter device 1 has an annular particle filter 3 elongated in the direction of a central axis 14 and circumferentially surrounding the central axis 14. The filter device 1 having at its top end face a coalescing element 4. The particle filter 3 is surrounded by a concentrically arranged, annular water separating element 5 that is arranged at a spacing relative to the radial exterior side of the particle filter 3 so that an inner annular space 6 is formed between the exterior side of the particle filter 3 and the inner side of the water separating element 5. The annular water separating element 5 is positioned also at a spacing to the inner wall of the filter housing 2 so that an outer annular space 7 between water separating element 5 and filter housing 2 is formed.

The bottom area of the filter housing 2 forms a water collecting container 8 that is either monolithically formed with the filter housing 2 or is designed as a separate component that is integrated into the filter housing or is connected to the filter housing. The unpurified fuel is supplied through a supply line 9 into the filter housing to the raw side of the particle filter 3; discharge of the purified fuel from the filter housing is realized through the discharge line 10. The water that is collected in the water collecting container 8 can flow out optionally by means of a separate line.

The flow path of the fuel to be purified is indicated by the arrows. First, the unpurified fuel is supplied through supply line 9 into the filter housing 2 to the raw side of the particle filter 3 that is located on the radial exterior side of the particle filter 3. The particle filter 3 is then flowed through in radial direction from the exterior to the interior wherein the cylindrical interior is the clean side of the particle filter 3 from where the fuel is conveyed axially in upward direction. The coalescing element 4 on the axial top end face 16 of the particle filter 3 separates the clean space from the outer annular space 7 between the inner wall of the filter housing 2 and the radial outer side of the water separating element 5. After having flowed through the coalescing element in radial direction from the interior to the exterior, the larger water droplets which have formed in the coalescing element 4 can deposit on the radial outwardly positioned wall of the hydrophobic water separating element 5 and are conveyed by the weight force in downward direction into the water collecting container 8. The fuel penetrates the water separating element 5 radially from the exterior to the interior, i.e., from the outer annular chamber 7 into the inner annular chamber 6, and is subsequently discharged by discharge line 10 from the filter device 1.

As a whole, in the filter device according to FIG. 1 a three-stage separation is achieved in which the particle filter 3, the coalescing element 4, and the water separating element 5 each form a stage of the filtration and these three components are positioned one after another in the flow path.

Figure 2:
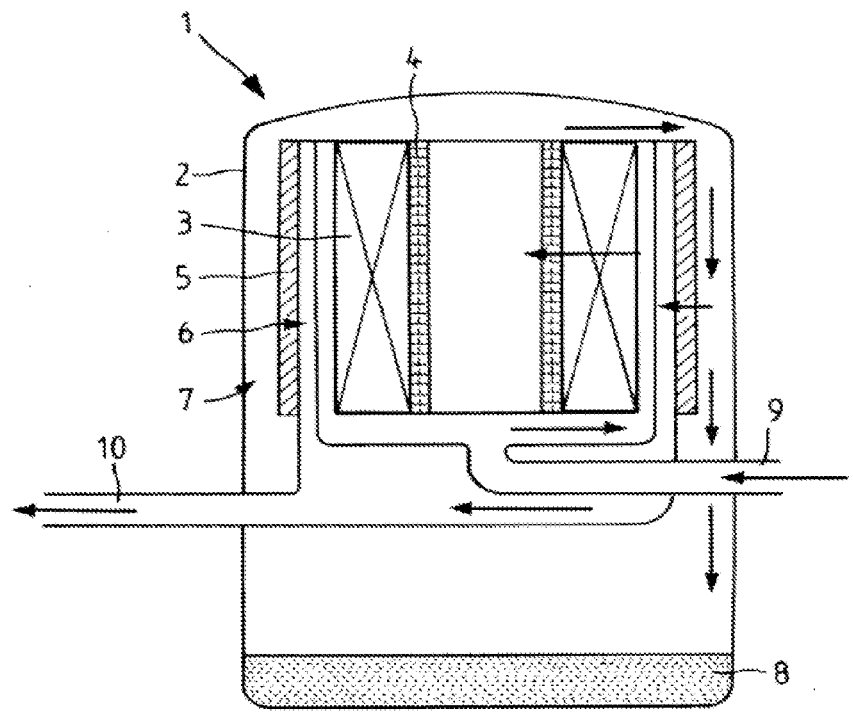
FIG. 2 a filter device for fuel filtration in a further embodiment, in which an annular coalescing element is arranged at the clean side of the particle filter.
Figure 3:
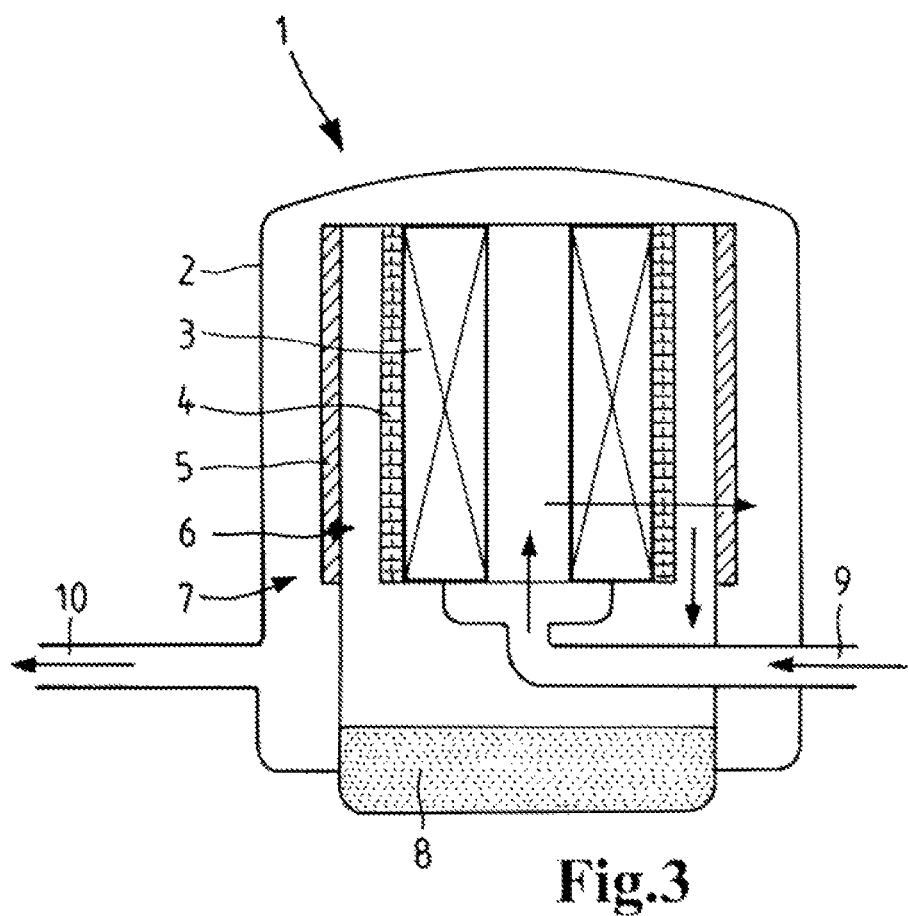
FIG. 3 a filter device for fuel filtration in a further embodiment, in which the particle filter is flowed through in radial direction from the interior to the exterior and a coalescing element is arranged on the exterior side of the particle filter wherein the water separating element is arranged radially spaced relative to the coalescing element.

In the embodiment according to FIGS. 2 and 3, a three-stage filtration is realized also, respectively. According to FIG. 2, on the radial inwardly positioned clean side of the particle filter 3 that is to be flowed through in radial direction from the exterior to the interior, the annular coalescing element 4 is arranged which adjoins immediately the clean side of the particle filter 3. From the inwardly positioned clean space the pre-purified fluid is guided across the top end face into the outer annular space 7 that is formed between the water separating element 5 and the inner side of the filter housing 2. On the outwardly positioned side of the water separating element 5, the water droplets can deposit; they are subsequently, following the weight force, conveyed in downward direction into the water collecting container 8. The fuel flows through the water separating element 5 in radial direction from the exterior to the interior and is discharged via the inwardly positioned annular space 6 to the discharge line 10 and by means of the latter discharged from the filter device 1.

In the embodiment according to FIG. 3, in contrast to the two aforementioned embodiments, the flow direction through the particle filter 3 is reversed. The interior of the annular particle filter 3 forms the raw side from where the particle filter is flowed through in radial direction from the interior to the exterior. Immediately at the radial outer side there is the coalescing element 4 for agglomeration of finely dispersed water droplets. The water separating element 5 surrounds at a spacing the coalescing element 4 wherein the separated water droplets flow out along the radial inner side of the water separating element 5 in downward direction into the water collecting container 8. The fuel can flow through the water separating element 5 in radial direction from the interior to the exterior, i.e., in radial direction from the inner annular space 6 to the outer annular space 7, and is subsequently discharged via the discharge line 10.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A filter device for filtering a fluid, the filter device comprising:
   an annular particle filter elongated in the direction of a central axis and circumferentially enclosing the central axis;
   wherein axial is a direction parallel to the central axis;
   wherein radial is a direction transverse to the central axis;
   wherein the annular particle filter has a raw side face where fluid enters the annular particle filter and a radially separated clean side face where purified fluid exits the particle filter and axially opposing end faces;
   an annular water separating element arranged in a flow path downstream of the particle filter;
   wherein the water separating element circumferentially surrounds the particle filter at a radial spacing;
   wherein an open inner annular space is defined by and between the particle filter and the water separating element;
   wherein an outer annular space is defined by and between the water separating element and a filter housing;
   a coalescing element is arranged in the flow path between the particle filter and the water separating element;
   wherein the coalescing element is arranged on one of the end faces of the particle filter.

2. A filter device for filtering a fluid, the filter device comprising:
   an annular particle filter elongated in the direction of a central axis and circumferentially enclosing the central axis;
   wherein axial is a direction parallel to the central axis;
   wherein radial is a direction transverse to the central axis;
   wherein the annular particle filter has a raw side face where fluid enters the annular particle filter and a radially separated clean side face where purified fluid exits the particle filter and axially opposing end faces;
   an annular water separating element arranged in a flow path downstream of the particle filter;
   wherein the water separating element circumferentially surrounds the particle filter at a radial spacing;
   wherein an open inner annular space is defined by and between the particle filter and the water separating element;
   wherein an outer annular space is defined by and between the water separating element and a filter housing;
   wherein a radially exterior side of the particle filter forms the raw side face; and
   a radially inner side of the particle filter forms the clean side face;
   wherein the fluid that has been purified in the particle filter flows out axially through the interior of the particle filter to exit axially from the particle filter.

3. The filter device according to claim 2, further comprising
   a coalescing element is arranged in the flow path between the particle filter and the water separating element.

4. The filter device according to claim 3, wherein
   the coalescing element forms a component that is embodied separate from the particle filter.

5. The filter device according to claim 2, wherein
   the fluid after having passed through the particle filter is guided across at least one of the end faces of the particle filter.

6. The filter device according to claim 2, wherein
   the fluid after having passed through the particle filter is guided across a top end face of the particle filter.

7. The filter device according to claim 2, wherein
   the fluid flows through the water separating element in radial direction from a radial exterior of the water separating element to a radial interior of the water separating element.

* * * * *